(12) United States Patent
Murayama

(10) Patent No.: US 11,199,963 B2
(45) Date of Patent: Dec. 14, 2021

(54) NON-CONTACT OPERATION INPUT DEVICE

(71) Applicant: FUNAI ELECTRIC CO., LTD., Osaka (JP)

(72) Inventor: Manabu Murayama, Osaka (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 0 days.

(21) Appl. No.: 16/813,761

(22) Filed: Mar. 10, 2020

(65) Prior Publication Data

US 2020/0319791 A1 Oct. 8, 2020

(30) Foreign Application Priority Data

Apr. 2, 2019 (JP) .............................. JP2019-070618

(51) Int. Cl.
| | |
|---|---|
| *G06F 3/0486* | (2013.01) |
| *G06F 3/044* | (2006.01) |
| *G06F 3/0488* | (2013.01) |
| *G06F 3/0481* | (2013.01) |
| *G06F 3/0484* | (2013.01) |

(52) U.S. Cl.
CPC ........ *G06F 3/04883* (2013.01); *G06F 3/0481* (2013.01); *G06F 3/04845* (2013.01); *G06F 2203/04806* (2013.01)

(58) Field of Classification Search
CPC ...... G06F 1/1643; G06F 1/169; G06F 1/1692; G06F 3/03547; G06F 3/041–0428; G06F 3/0488–04886; G06F 2200/1634; G06F 2203/0339; G06F 2203/04101; G06F 2203/04103–04113; G06F 2203/04809; G06F 3/04845; G06F 2203/04806
See application file for complete search history.

(56) References Cited

U.S. PATENT DOCUMENTS

| | | |
|---|---|---|
| 2009/0122007 A1 | 5/2009 | Tsuzaki et al. |
| 2010/0107099 A1 | 4/2010 | Frazier et al. |
| 2010/0289740 A1* | 11/2010 | Kim ........................ G06F 3/046 345/157 |
| 2010/0328351 A1 | 12/2010 | Tan |

(Continued)

FOREIGN PATENT DOCUMENTS

| | | |
|---|---|---|
| EP | 1912114 | 4/2008 |
| JP | 2014067071 | 4/2014 |

*Primary Examiner* — Sanghyuk Park
(74) *Attorney, Agent, or Firm* — JCIPRNET

(57) ABSTRACT

An input device capable of enhancing operability is provided, including: a display control unit that displays an operation screen on a display surface, and a first detection unit and a second detection unit 8 that detect respective positions of an object in a first sensing layer and a second sensing layer in air formed side by side in a direction substantially perpendicular to the display surface. When the object passes through the first sensing layer in a direction approaching the display surface, the display control unit determines a first partial operation screen including a position on the operation screen corresponding to a position of the object in the first sensing layer based on respective detection results of the first detection unit and the second detection unit, and enlarges and displays the determined first partial operation screen on the display surface.

16 Claims, 12 Drawing Sheets

(56) References Cited

U.S. PATENT DOCUMENTS

| | | |
|---|---|---|
| 2012/0079416 A1 | 3/2012 | Fagans |
| 2014/0247218 A1* | 9/2014 | Walton ................ G06F 3/04842 345/168 |
| 2015/0002475 A1* | 1/2015 | Tiao ........................ G06F 3/017 345/175 |
| 2015/0052476 A1 | 2/2015 | Nakao |
| 2015/0095816 A1 | 4/2015 | Pan |
| 2016/0048304 A1* | 2/2016 | Niranjani ............ G06F 3/04186 715/800 |
| 2016/0179328 A1* | 6/2016 | Yang .................... G06F 3/0488 715/863 |
| 2016/0349968 A1* | 12/2016 | Daniel ................ G06K 9/2081 |

* cited by examiner

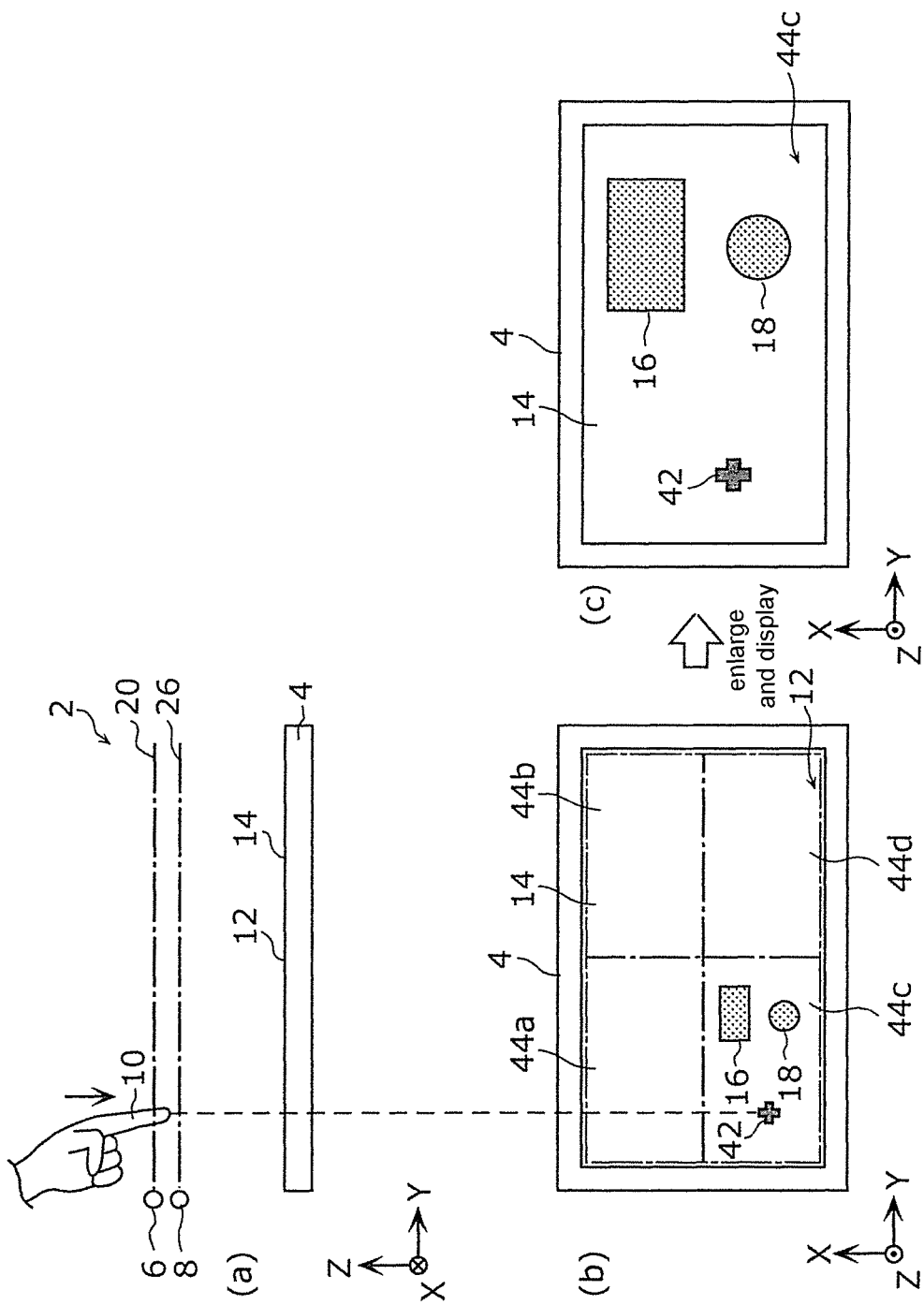

NON-CONTACT OPERATION INPUT DEVICE

CROSS REFERENCE TO RELATED APPLICATIONS

This application claims the priority benefit of Japanese Patent Application No. 2019-070618, filed on Apr. 2, 2019. The entirety of the above-mentioned patent application is hereby incorporated by reference herein and made a part of this specification.

BACKGROUND OF THE DISCLOSURE

Technical Field

The disclosure relates to an input device for receiving a specific non-contact operation performed on an operation screen by an object.

Related Art

In the food processing field and the medical field where hygiene management is strict, it is not preferable to use a touch panel display with which a finger of a user is in direct contact since the touch panel display may become a pathogen infection source. For this reason, in each of the aforementioned fields, it has been proposed to use an input device for receiving a specific non-contact operation performed on the operation screen by the finger of the user (for example, see patent literature 1 (Japanese Patent Application Laid-open No. 2014-67071)).

A conventional input device forms an aerial image (real image) indicating an operation screen in an aerial display area, and detects movement of a finger of a user in a detection area facing the aerial image, thereby determining that a specific non-contact operation on the operation screen has been performed.

In the aforementioned conventional input device, for example, when the user attempts to select a specific button on the operation screen, there is a risk of erroneous operation of erroneously selecting another button, etc.

The disclosure provides an input device that can enhance operability.

SUMMARY

According to one embodiment of the disclosure, an input device is provided for receiving a specific non-contact operation performed on an operation screen by an object, including: a display control unit that displays the operation screen on a display surface; and a detection unit that detects a position of the object in each of a plurality of sensing layers in air formed side by side in a direction substantially perpendicular to the display surface. When the object passes through a specific sensing layer among the plurality of sensing layers in a direction approaching the display surface, the display control unit determines, based on a detection result of the detection unit, a first partial operation screen and enlarges and displays the determined first partial operation screen on the display surface. The first partial operation screen is a part of the operation screen and comprises a position on the operation screen corresponding to a position of the object in the specific sensing layer.

BRIEF DESCRIPTION OF THE DRAWINGS

FIG. 5A is a diagram for description of a state in which an object passes through a first sensing layer in the input device according to Embodiment 1.

DESCRIPTION OF THE EMBODIMENTS

Hereinafter, embodiments of the disclosure will be described in detail with reference to the drawings. Moreover, it should be noted that each of the embodiments described below shows a comprehensive or specific example. Numerical values, shapes, materials, components, arrangement positions and connection forms of the components, etc. shown in the following embodiments are merely examples, and are not intended to limit the disclosure. In addition, among the components in the following embodiments, components that are not described in the independent claims are described as arbitrary components.

Embodiment 1

1-1. Configuration of Input Device

Figure 1:
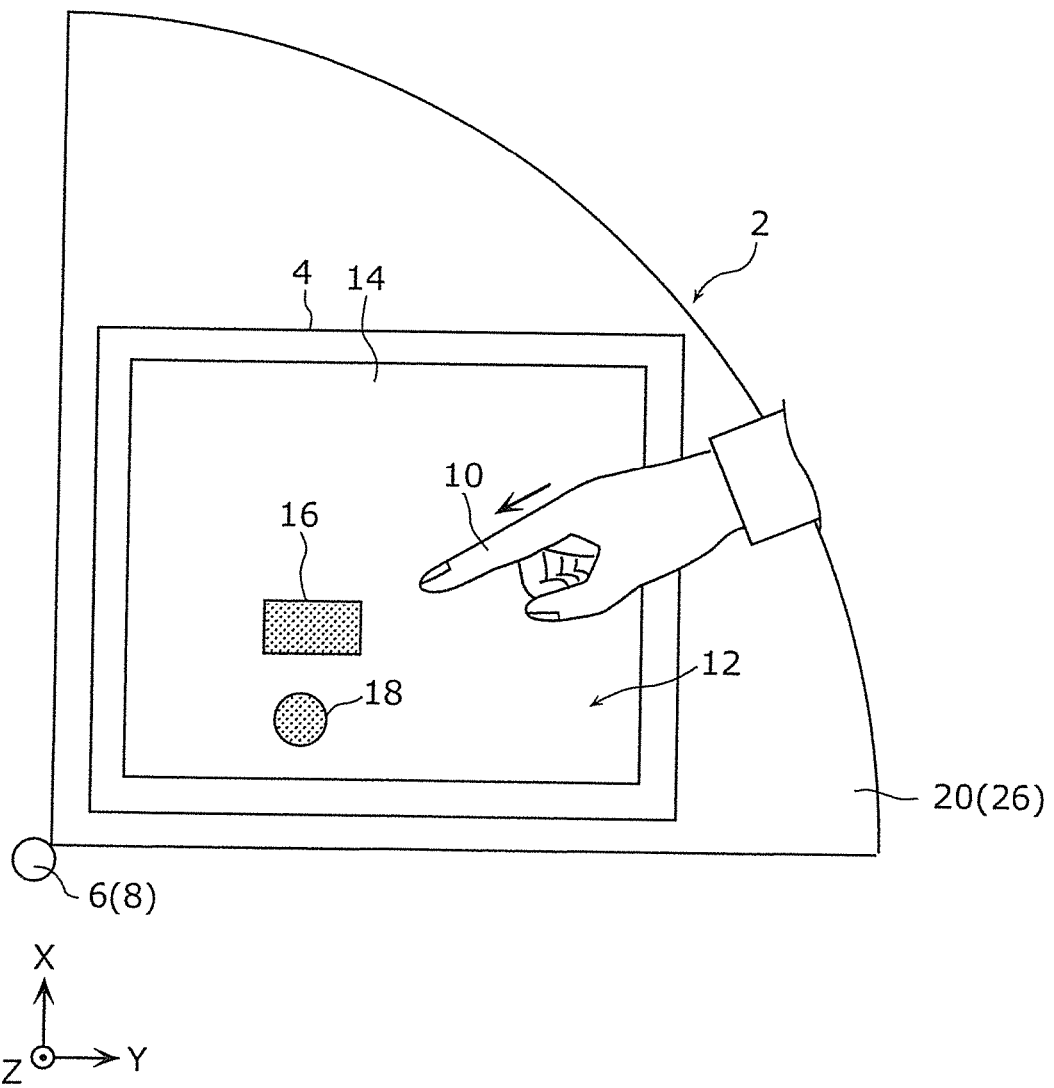
FIG. 1 is a plan view illustrating an input device according to Embodiment 1.
Figure 2:
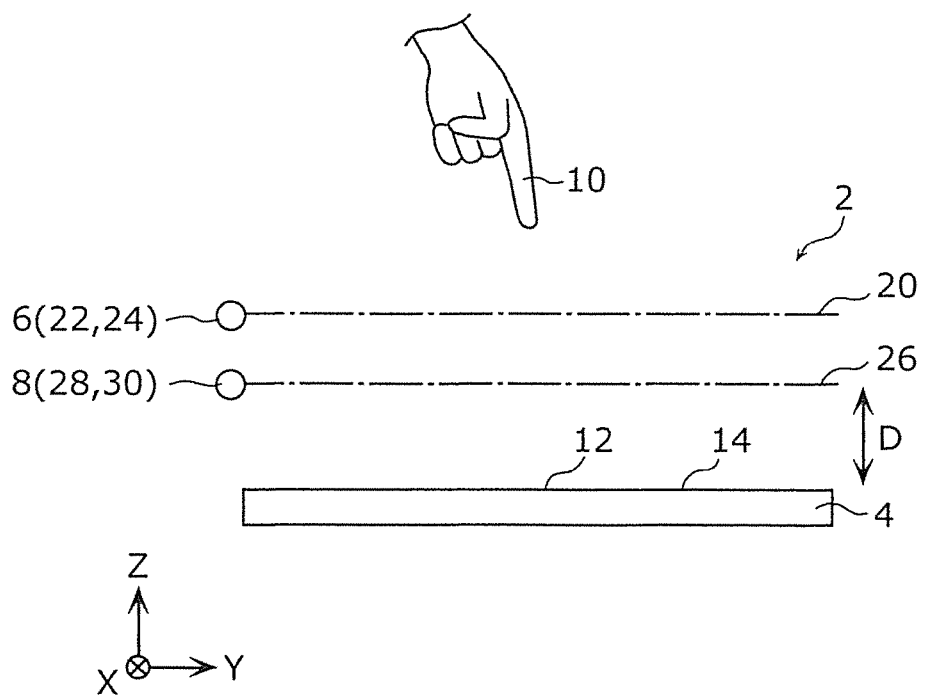
FIG. 2 is a side view illustrating the input device according to Embodiment 1.
Figure 3:
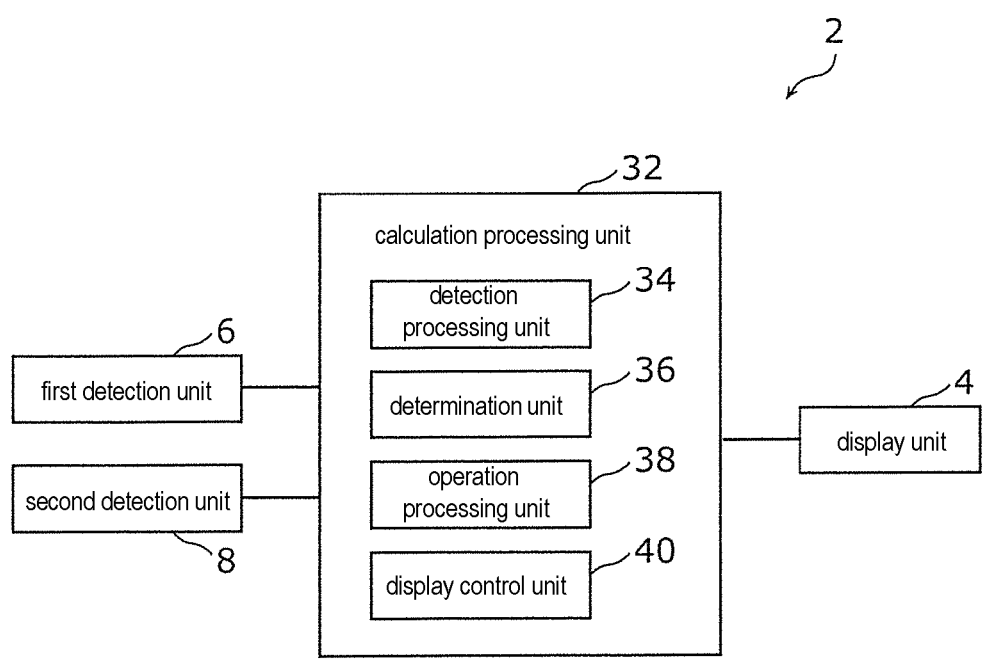
FIG. 3 is a block diagram illustrating a configuration of the input device according to Embodiment 1.

First, a configuration of an input device 2 according to Embodiment 1 is described with reference to FIG. 1 to FIG. 3. FIG. 1 is a plan view illustrating the input device 2 according to Embodiment 1. FIG. 2 is a side view illustrating the input device 2 according to Embodiment 1. FIG. 3 is a block diagram illustrating a configuration of the input device 2 according to Embodiment 1.

As illustrated in FIG. 1 and FIG. 2, the input device 2 includes a display unit 4, a first detection unit 6 (an example of a detection unit), and a second detection unit 8 (an example of a detection unit). The input device 2 is applied as a user interface for operating a device (not illustrated) used in, for example, the food processing field or the medical field in a non-contact manner by an object 10 (for example, a finger of a user).

The display unit 4 is, for example, a liquid crystal display panel. The display unit 4 has a display surface 14 for displaying an operation screen 12. The operation screen 12 is, for example, an operation menu screen or the like of the device. In the example illustrated in FIG. 1, a plurality of buttons 16 and 18 for operating the device is displayed on the operation screen 12.

The first detection unit 6 detects a position of the object 10 in a first sensing layer 20 in air formed to face the display surface 14 of the display unit 4. Moreover, the first sensing layer 20 is a virtual plane (XY plane) formed at an aerial position substantially parallel to the display surface 14 of the display unit 4. The first detection unit 6 includes, for example, a scan sensor, and is disposed to face a corner of the display unit 4 as illustrated in FIG. 1. As illustrated in FIG. 2, the first detection unit 6 includes a first light emitting unit 22 and a first light receiving unit 24. The first light emitting unit 22 two-dimensionally scans an infrared laser in the first sensing layer 20. The first light receiving unit 24 receives and detects light reflected by the object 10 passing through the first sensing layer 20.

The second detection unit 8 detects a position of the object 10 in a second sensing layer 26 in air formed between the display surface 14 of the display unit 4 and the first sensing layer 20. Moreover, the second sensing layer 26 is a virtual plane (XY plane) formed at an aerial position substantially parallel to the display surface 14 of the display unit 4. That is, the first sensing layer 20 and the second sensing layer 26 are formed side by side in a direction substantially perpendicular to the display surface 14 (Z-axis direction). The second detection unit 8 includes, for example, a scan sensor, and is disposed to face a corner of the display unit 4 as illustrated in FIG. 1. As illustrated in FIG. 2, the second detection unit 8 includes a second light emitting unit 28 and a second light receiving unit 30. The second light emitting unit 28 two-dimensionally scans an infrared laser in the second sensing layer 26. The second light receiving unit 30 receives and detects light reflected by the object 10 passing through the second sensing layer 26.

Moreover, as illustrated in FIG. 2, a distance D between the second sensing layer 26 and the display surface 14 of the display unit 4 is a size (for example, about 1 cm to several centimeters) at which the object 10 does not come into direct contact with the display surface 14 of the display unit 4 when the object 10 passes through the second sensing layer 26.

As illustrated in FIG. 3, the input device 2 further includes a calculation processing unit 32. The calculation processing unit 32 includes a detection processing unit 34, a determination unit 36, an operation processing unit 38, and a display control unit 40.

The detection processing unit 34 computes a position (two-dimensional coordinates) of the object 10 in the first sensing layer 20 based on a detection signal from the first detection unit 6. In addition, the detection processing unit 34 computes a position (two-dimensional coordinates) of the object 10 in the second sensing layer 26 based on a detection signal from the second detection unit 8.

The determination unit 36 determines the presence or absence of a specific non-contact operation performed on the operation screen 12 by the object 10 based a computation result of the detection processing unit 34. Moreover, the specific non-contact operation is, for example, a non-contact single touch gesture and the like performed on the operation screen 12 by the finger of the user. The single touch gesture is a gesture performed by one finger (for example, an index finger) of the user, and is, for example, a gesture such as a tap.

The operation processing unit 38 executes processing corresponding to the specific non-contact operation based on the computation result of the detection processing unit 34 and a determination result of the determination unit 36. For example, when the user performs a single touch gesture on the button 16 on the operation screen 12 in a non-contact manner, the operation processing unit 38 executes a process of selecting the button 16, etc.

The display control unit 40 controls the display of the operation screen 12 on the display surface 14 of the display unit 4 based on the computation result of the detection processing unit 34. The processing by the display control unit 40 will be described later in detail.

1-2. Operation of Input Device

Figure 4:
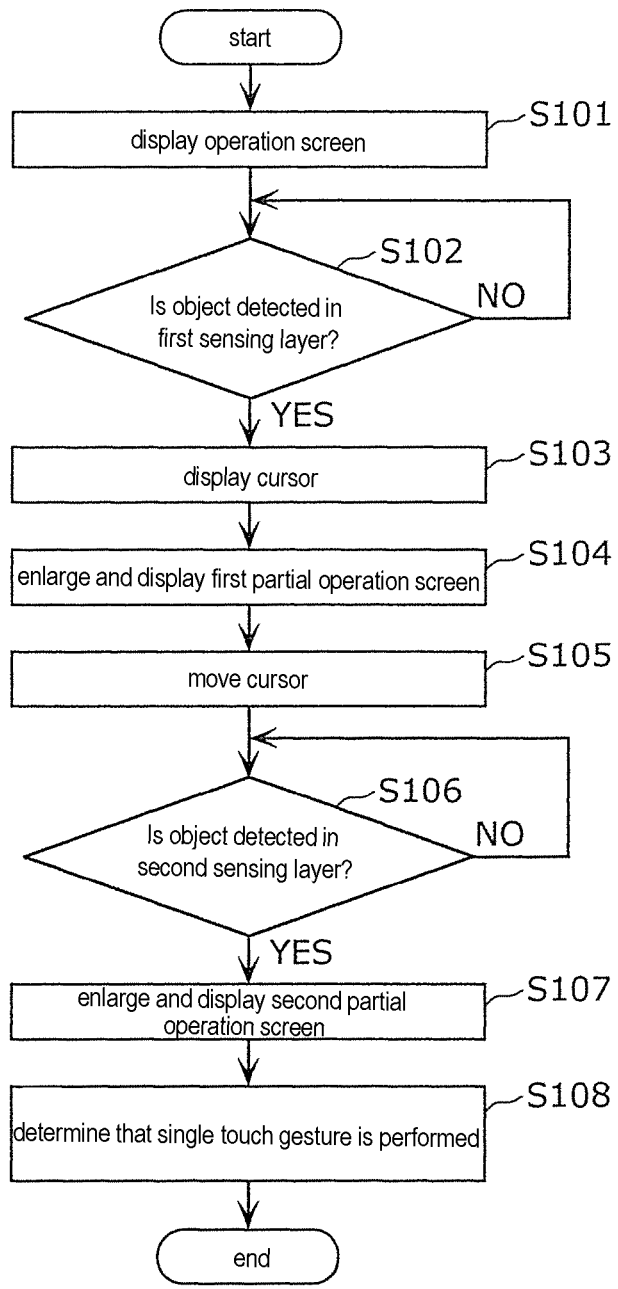
FIG. 4 is a flowchart illustrating an operation flow of the input device according to Embodiment 1.
Figure 5B:
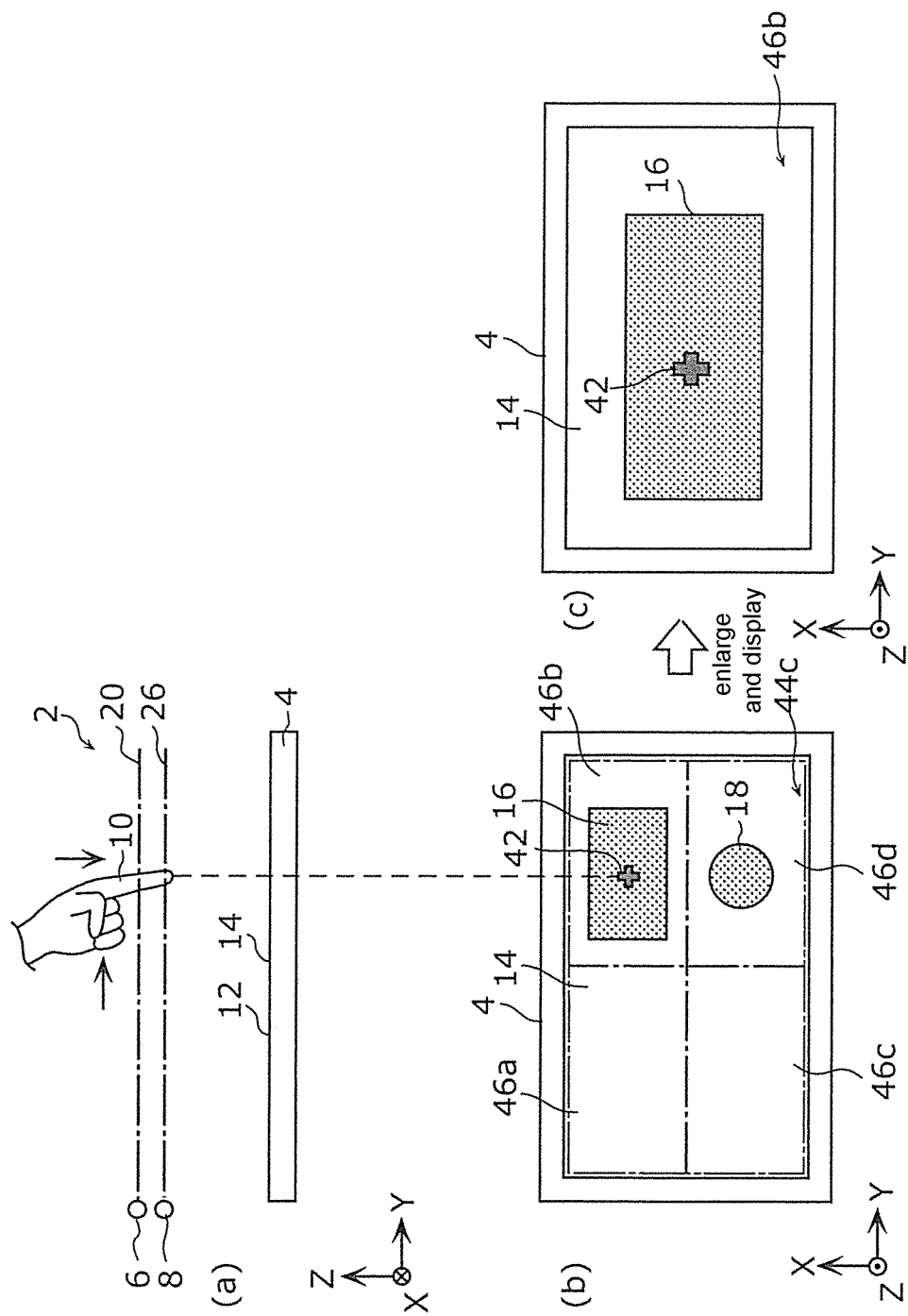
FIG. 5B is a diagram for description of a state in which the object passes through a second sensing layer in the input device according to Embodiment 1.

Next, an operation of the input device 2 according to Embodiment 1 is described with reference to FIG. 4 to FIG. 5B. FIG. 4 is a flowchart illustrating an operation flow of the input device 2 according to Embodiment 1. FIG. 5A is a diagram for description of a state in which the object 10 passes through the first sensing layer 20 in the input device 2 according to Embodiment 1. FIG. 5B is a diagram for description of a state in which the object 10 passes through the second sensing layer 26 in the input device 2 according to Embodiment 1.

Hereinafter, a description is given of an operation of the input device 2 in a case that the user performs a single touch gesture on the button 16 on the operation screen 12 in a non-contact manner.

As illustrated in FIG. 4, first, the display control unit 40 displays the operation screen 12 on the display surface 14 of the display unit 4 (S101). When the object 10 (one finger) does not pass through the first sensing layer 20 in a direction approaching the display surface 14 (negative direction of a Z-axis), and the first detection unit 6 does not detect the object 10 in the first sensing layer 20 (NO in S102), the operation screen 12 continues to be displayed on the display surface 14 of the display unit 4.

As illustrated in (a) of FIG. 5A, when the first detection unit 6 detects the object 10 in the first sensing layer 20 by the object 10 passing through the first sensing layer 20 in the direction approaching the display surface 14 (YES in S102), the display control unit 40 displays the cursor 42 on the operation screen 12 as illustrated in (b) of FIG. 5A based on a computation result of the detection processing unit 34 (S103). In this instance, the cursor 42 is displayed at a position on the operation screen 12 corresponding to a position of the object 10 in the first sensing layer 20. Moreover, a sound may be output from a speaker (not illustrated) of the display unit 4 at the same time as the cursor 42 is displayed on the operation screen 12.

In addition, the display control unit 40 determines a first partial operation screen including a position of the cursor 42 from among four first partial operation screens 44a, 44b, 44c, and 44d (44a to 44d) obtained by dividing the operation screen 12 into four parts. The first partial operation screens 44a to 44d are parts of the operation screen 12, and divide the operation screen 12 into four parts in two rows and two columns. In the example illustrated in (b) of FIG. 5A, since the cursor 42 is positioned on the first partial operation screen 44c, the display control unit 40 determines the first partial operation screen 44c including the position of the cursor 42 from among the four first partial operation screens 44a to 44d. Moreover, a plurality of buttons 16 and 18 is disposed on the first partial operation screen 44c.

As illustrated in (c) of FIG. 5A, the display control unit 40 enlarges and displays the determined first partial operation screen 44c on the display surface 14 of the display unit 4

(S104). In this instance, for example, the first partial operation screen 44c is displayed on the entire display surface 14 of the display unit 4.

In this state, when the object 10 moves along the first sensing layer 20 (that is, in the XY plane), the display control unit 40 moves the cursor 42 on the first partial operation screen 44c so that the cursor 42 follows the movement of the object 10 based on a computation result of the detection processing unit 34 (S105).

When the object 10 does not pass through the second sensing layer 26 in the direction approaching the display surface 14 and the second detection unit 8 does not detect the object 10 in the second sensing layer 26 (NO in S106), the first partial operation screen 44c continues to be displayed on the display surface 14 of the display unit 4.

Thereafter, as illustrated in (a) and (b) of FIG. 5B, when the second detection unit 8 detects the object 10 in the second sensing layer 26 by the object 10 passing through the second sensing layer 26 in the direction approaching the display surface 14 in a state that the cursor 42 is superimposed on the button 16 on the first partial operation screen 44c (YES in S106), the display control unit 40 determines the second partial operation screen including the position of the cursor 42 from among four second partial operation screens 46a, 46b, 46c, and 46d (46a to 46d) obtained by further dividing the first partial operation screen 44c into four parts. The second partial operation screens 46a to 46d are parts of the operation screen 12, and divide the first partial operation screen 44c into four parts in two rows and two columns. In the example illustrated in (b) of FIG. 5B, since the cursor 42 is positioned on the second partial operation screen 46b, the display control unit 40 determines the second partial operation screen 46b including the position of the cursor 42 from among the four second partial operation screens 46a to 46d. The button 16 is disposed on the second partial operation screen 46b.

As illustrated in (c) of FIG. 5B, the display control unit 40 enlarges and displays the determined second partial operation screen 46b on the display surface 14 of the display unit 4 (S107). In this instance, for example, the second partial operation screen 46b is displayed on the entire display surface 14 of the display unit 4.

When the object 10 passes through the second sensing layer 26 in a state that the cursor 42 is superimposed on the button 16, the determination unit 36 determines that a single touch gesture is performed (S108).

Moreover, when the single touch gesture is completed, the user pulls out one finger from the first sensing layer 20. When the object 10 passes through the first sensing layer 20 in a direction away from the display surface 14 (positive direction of the Z-axis) in this way, the display control unit 40 returns the display on the display surface 14 from the enlarged and displayed second partial operation screen 46b to the original operation screen 12.

1-3. Effect

As described above, the display control unit 40 enlarges and displays the first partial operation screen 44c including the position of the cursor 42 on the display surface 14 of the display unit 4 from among the four first partial operation screens 44a to 44d. In this way, the user can easily perform a specific non-contact operation such as a non-contact single touch gesture on the target button 16 on the first partial operation screen 44c while visually checking the enlarged and displayed first partial operation screen 44c. As a result, the operability of the input device 2 can be improved.

Embodiment 2

2-1. Configuration of Input Device

Figure 6:
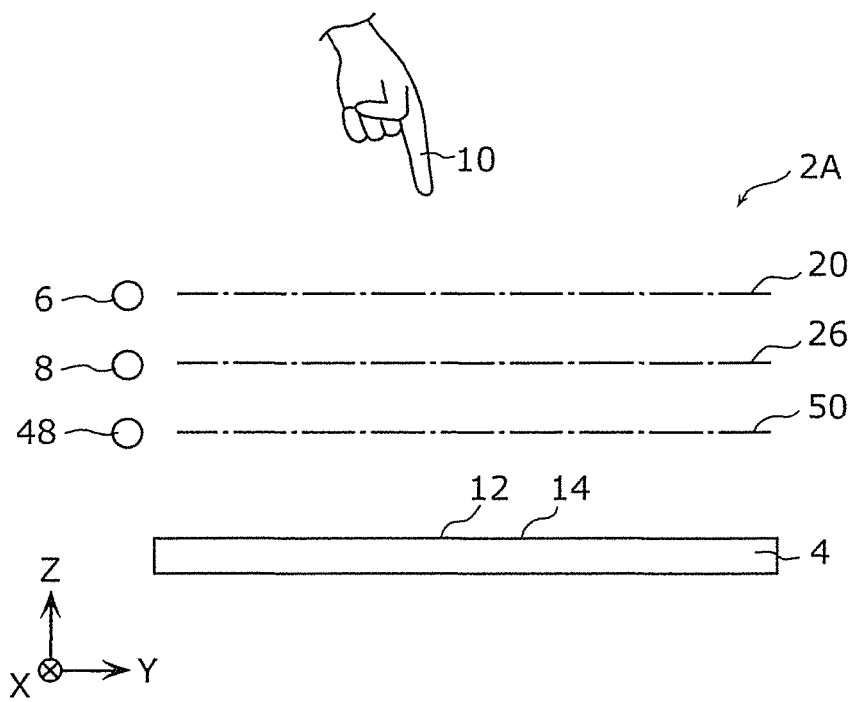
FIG. 6 is a side view illustrating an input device according to Embodiment 2.
Figure 7:
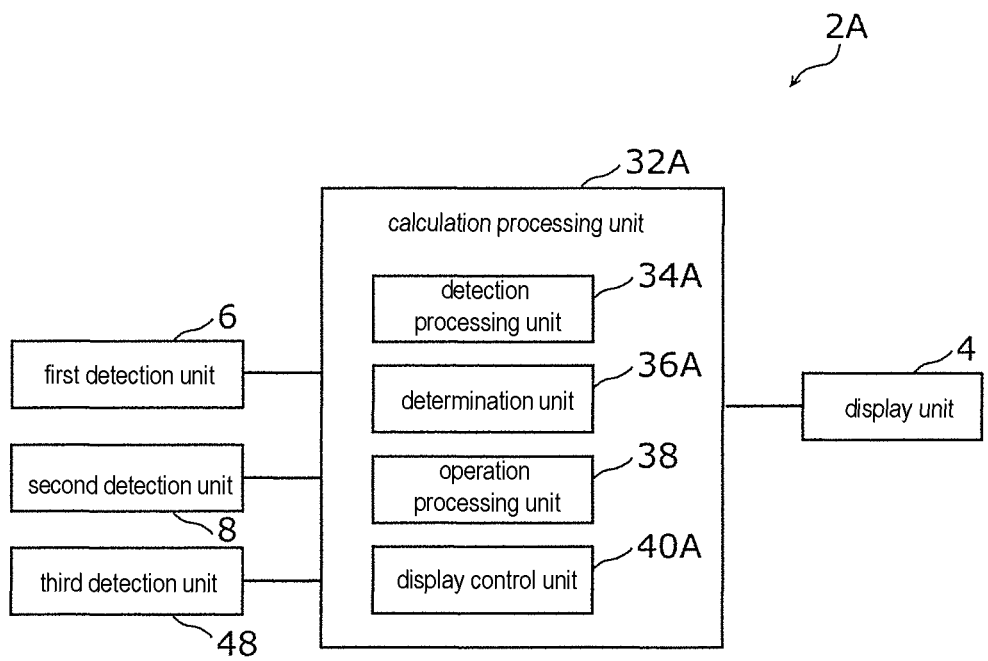
FIG. 7 is a block diagram illustrating a configuration of the input device according to Embodiment 2.

Next, a configuration of an input device 2A according to Embodiment 2 is described with reference to FIG. 6 and FIG. 7. FIG. 6 is a side view illustrating the input device 2A according to Embodiment 2. FIG. 7 is a block diagram illustrating the configuration of the input device 2A according to Embodiment 2. Moreover, in the present embodiment, the same components as those in Embodiment 1 are denoted by the same reference numerals, and the description thereof is omitted.

As illustrated in FIG. 6, the input device 2A according to Embodiment 2 includes a third detection unit 48 (an example of the detection unit) in addition to the first detection unit 6 and the second detection unit 8.

The third detection unit 48 detects the position of the object 10 in a third sensing layer 50 in air formed between the display surface 14 of the display unit 4 and the second sensing layer 26. Moreover, the third sensing layer 50 is a virtual plane (XY plane) formed at an aerial position substantially parallel to the display surface 14 of the display unit 4. Similarly to the first detection unit 6 and the second detection unit 8, the third detection unit 48 includes, for example, a scan sensor.

In addition, as illustrated in FIG. 7, in the input device 2A according to Embodiment 2, respective processing of a detection processing unit 34A, a determination unit 36A, and a display control unit 40A of the calculation processing unit 32A is different from those of Embodiment 1.

In addition to the processing described in Embodiment 1, the detection processing unit 34A computes the position (two-dimensional coordinates) of the object 10 in the third sensing layer 50 based on a detection signal from the third detection unit 48.

The determination unit 36A determines the presence or absence of the specific non-contact operation performed on the operation screen 12 by the object 10 based on a computation result of the detection processing unit 34A.

The display control unit 40A controls the display of the operation screen 12 on the display surface 14 of the display unit 4 based on the computation result of the detection processing unit 34A. The processing by the display control unit 40A will be described later in detail.

2-2. Operation of Input Device

Figure 8:
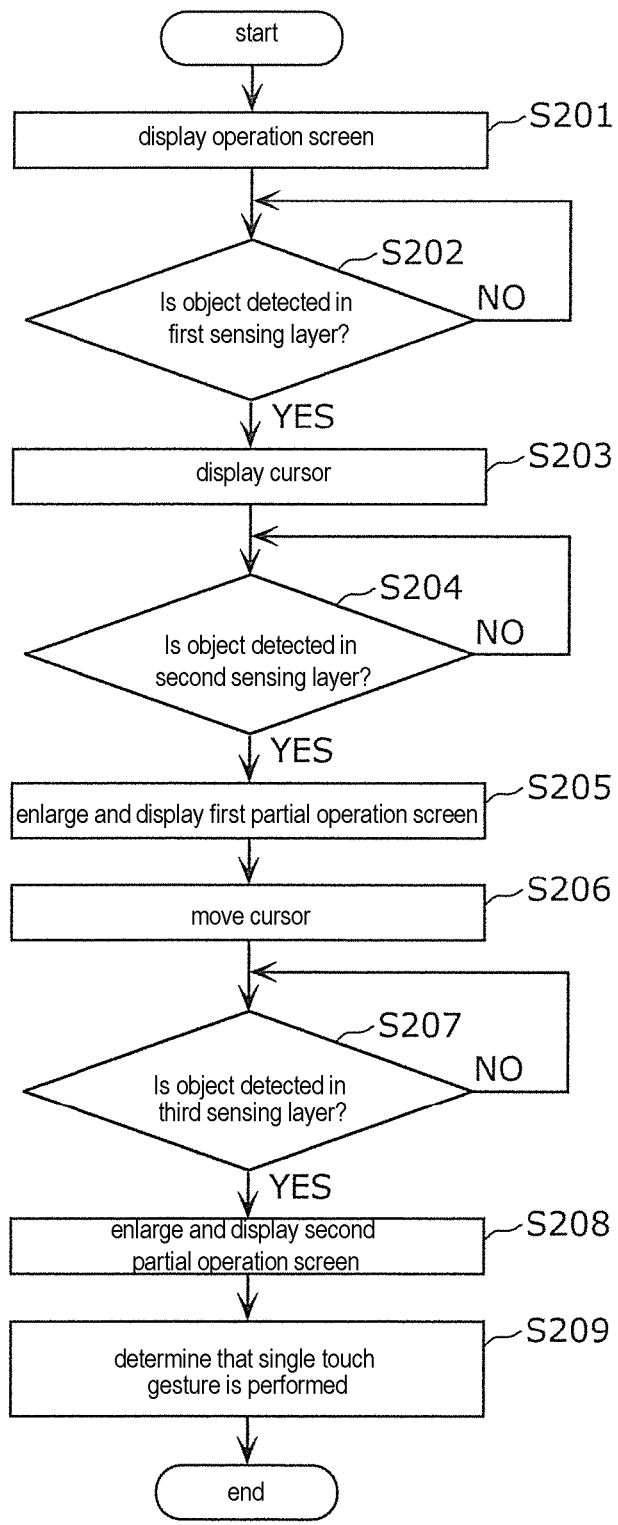
FIG. 8 is a flowchart illustrating an operation flow of the input device according to Embodiment 2.
Figure 9A:
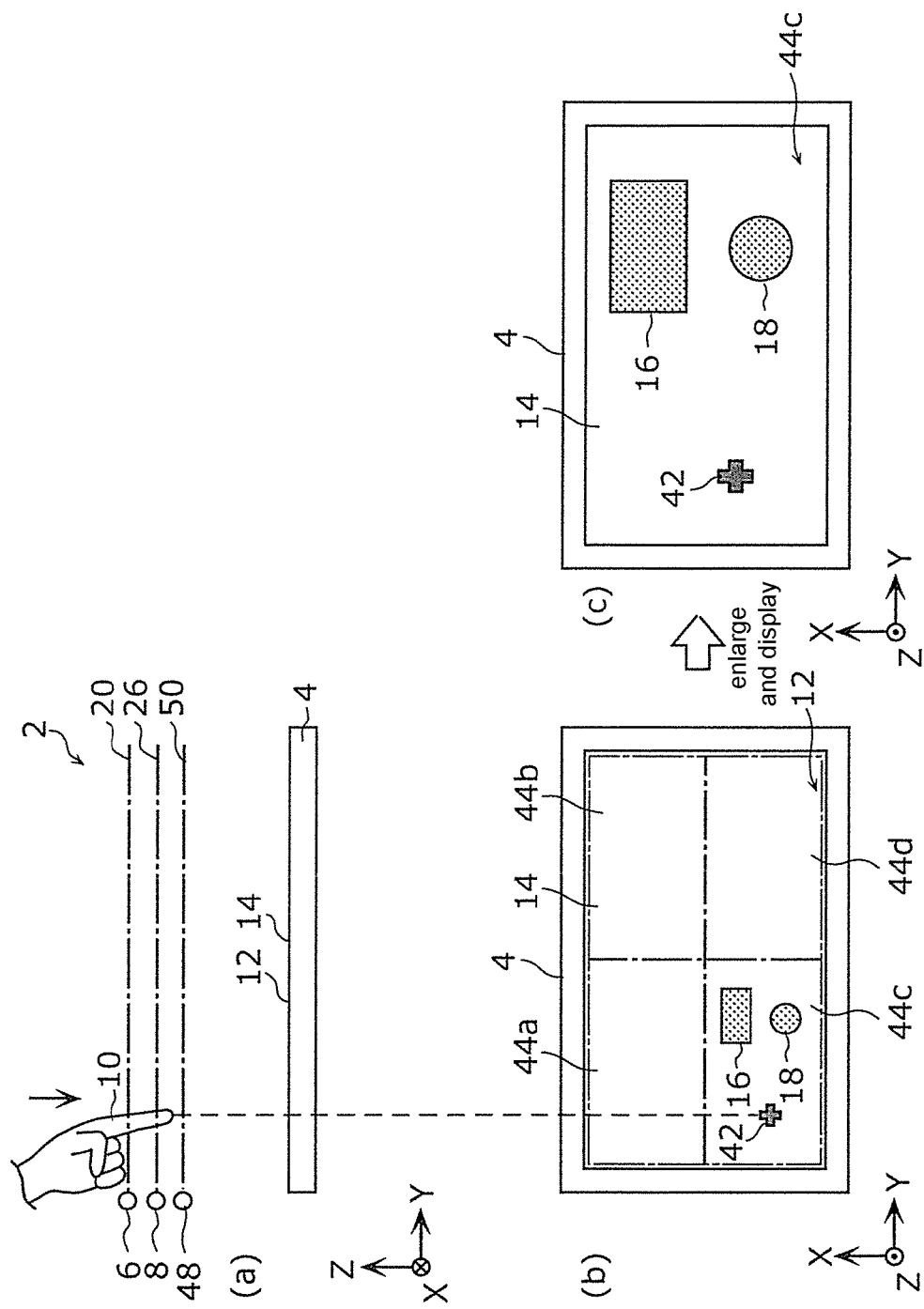
FIG. 9A is a diagram for description of a state in which the object passes through a second sensing layer in the input device according to Embodiment 2.
Figure 9B:
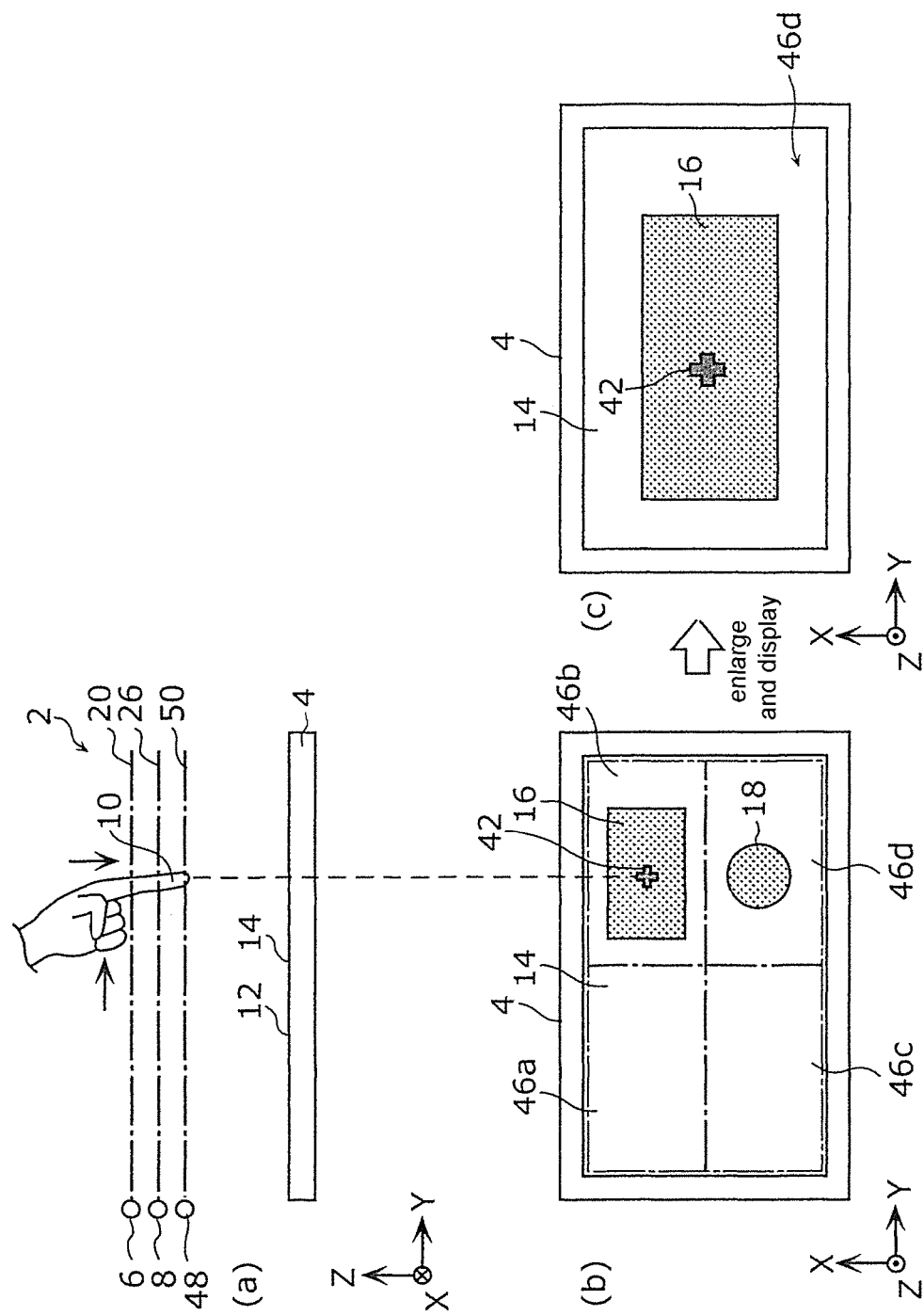
FIG. 9B is a diagram for description of a state in which the object passes through a third sensing layer in the input device according to Embodiment 2.

Next, an operation of the input device 2A according to Embodiment 2 is described with reference to FIG. 8 to FIG. 9B. FIG. 8 is a flowchart illustrating an operation flow of the input device 2A according to Embodiment 2. FIG. 9A is a diagram for description of a state in which the object 10 passes through the second sensing layer 26 in the input device 2A according to Embodiment 2. FIG. 9B is a diagram for description of a state in which the object 10 passes through the third sensing layer 50 in the input device 2A according to Embodiment 2.

Hereinafter, a description is given of an operation of the input device 2A in a case that the user performs a single touch gesture on the button 16 on the operation screen 12 in a non-contact manner.

As illustrated in FIG. 8, first, the display control unit 40A displays the operation screen 12 on the display surface 14 of the display unit 4 (S201). When the object 10 does not pass through the first sensing layer 20 in the direction approaching the display surface 14 and the first detection unit 6 does not detect the object 10 in the first sensing layer 20 (NO in S202), the operation screen 12 continues to be displayed on the display surface 14 of the display unit 4.

When the first detection unit 6 detects the object 10 in the first sensing layer 20 by the object 10 passing through the first sensing layer 20 in the direction approaching the display surface 14 (YES in S202), the display control unit 40A displays the cursor 42 on the operation screen 12 based on a computation result of the detection processing unit 34A (S203).

When the object 10 does not pass through the second sensing layer 26 in the direction approaching the display surface 14 and the second detection unit 8 does not detect the object 10 in the second sensing layer 26 (NO in S204), the operation screen 12 and the cursor 42 continues to be displayed on the display surface 14 of the display unit 4.

As illustrated in (a) of FIG. 9A, when the second detection unit 8 detects the object 10 in the second sensing layer 26 by the object 10 passing through the second sensing layer 26 in the direction approaching the display surface 14 (YES in S204), the display control unit 40A determines a first partial operation screen including the position of the cursor 42 from among four first partial operation screens 44a to 44d obtained by dividing the operation screen 12 into four parts based on a computation result of the detection processing unit 34A. In the example illustrated in (b) of FIG. 9A, since the cursor 42 is positioned on the first partial operation screen 44c, the display control unit 40A determines the first partial operation screen 44c including the position of the cursor 42 from among the four first partial operation screens 44a to 44d. As illustrated in (c) of FIG. 9A, the display control unit 40A enlarges and displays the determined first partial operation screen 44c on the display surface 14 of the display unit 4 (S205).

In this state, when the object 10 moves along the second sensing layer 26 (that is, in the XY plane), the display control unit 40A moves the cursor 42 on the first partial operation screen 44c so that the cursor 42 follows the movement of the object 10 based on the computation result of the detection processing unit 34A (S206).

When the object 10 does not pass through the third sensing layer 50 in the direction approaching the display surface 14 and the third detection unit 48 does not detect the object 10 in the third sensing layer 50 (NO in S207), the first partial operation screen 44c continues to be displayed on the display surface 14 of the display unit 4.

Thereafter, as illustrated in (a) and (b) of FIG. 9B, when the third detection unit 48 detects the object 10 in the third sensing layer 50 by the object 10 passing through the third sensing layer 50 in the direction approaching the display surface 14 in a state that the cursor 42 is superimposed on the first partial operation screen 44c (YES in S207), the display control unit 40A determines a second partial operation screen including the position of the cursor 42 from among four second partial operation screens 46a to 46d obtained by further dividing the first partial operation screen 44c into four parts. In the example illustrated in (b) of FIG. 9B, since the cursor 42 is positioned on the second partial operation screen 46b, the display control unit 40A determines the second partial operation screen 46b including the position of the cursor 42 from among the four second partial operation screens 46a to 46d. As illustrated in (c) of FIG. 9B, the display control unit 40A enlarges and displays the determined second partial operation screen 46b on the display surface 14 of the display unit 4 (S208).

When the object 10 passes the third sensing layer 50 in a state that the cursor 42 is superimposed on the button 16, the determination unit 36A determines that the single touch gesture is performed (S209).

2-3. Effect

In the present embodiment, the operability of the input device 2A can be improved as in Embodiment 1.

Embodiment 3

3-1. Configuration of Input Device

Figure 10:
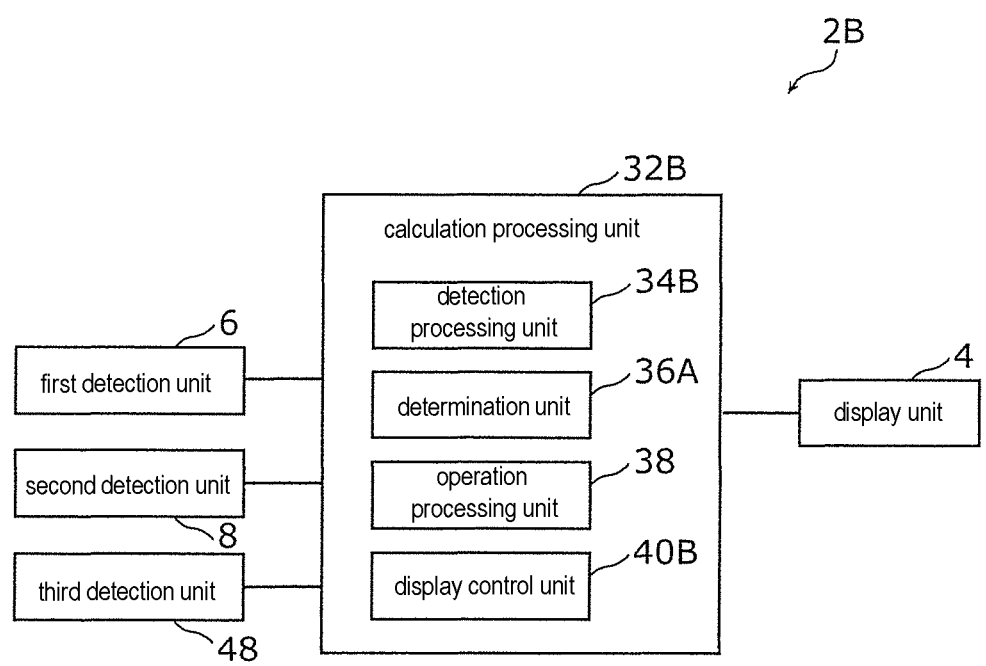
FIG. 10 is a block diagram illustrating a configuration of an input device according to Embodiment 3.

Next, a configuration of an input device 2B is described according to Embodiment 3 with reference to FIG. 10. FIG. 10 is a block diagram illustrating the configuration of the input device 2B according to Embodiment 3. In the present embodiment, the same components as those in Embodiment 2 are denoted by the same reference numerals, and the description thereof is omitted.

As illustrated in FIG. 10, in the input device 2B according to Embodiment 3, respective processing of a detection processing unit 34B and a display control unit 40B of a calculation processing unit 32B is different from those of Embodiment 2.

The detection processing unit 34B computes a first movement time when the object 10 (see FIG. 6) moves from the first sensing layer 20 (see FIG. 6) to the second sensing layer 26 (see FIG. 6) based on respective detection signals from the first detection unit 6 and the second detection unit 8. In addition, the detection processing unit 34B computes a second movement time when the object 10 moves from the second sensing layer 26 to the third sensing layer 50 (see FIG. 6) based on respective detection signals from the second detection unit 8 and the third detection unit 48.

The display control unit 40B determines an enlargement magnification of the first partial operation screens 44a to 44d based on the first movement time computed by the detection processing unit 34B. Here, the display control unit 40B performs determination in a manner that the enlargement magnification of the first partial operation screens 44a to 44d decreases as the first movement time increases. For example, the display control unit 40B determines the enlargement magnification to be "4 times" when the user rapidly moves the finger, and the display control unit 40B determines the enlargement magnification to be "1.5 times" when the user slowly moves the finger.

In addition, the display control unit 40B determines an enlargement magnification of the second partial operation screens 46a to 46d based on the second movement time computed by the detection processing unit 34B. Similarly to the above description, the display control unit 40B performs determination in a manner that the enlargement magnification of the second partial operation screens 46a to 46d decreases as the second movement time increases.

3-2. Operation of Input Device

Figure 11:
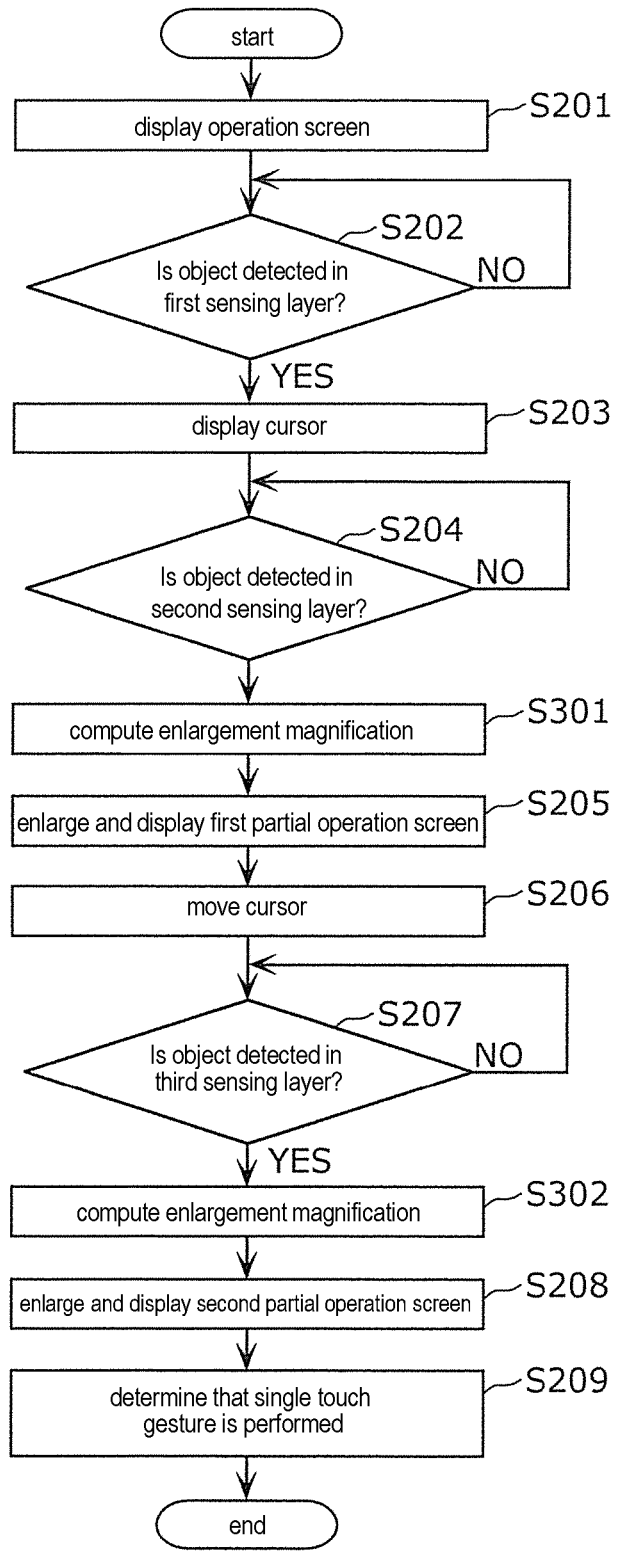
FIG. 11 is a flowchart illustrating an operation flow of the input device according to Embodiment 3.

Next, an operation of the input device 2B is described according to Embodiment 3 with reference to FIG. 11. FIG. 11 is a flowchart illustrating an operation flow of the input device 2B according to Embodiment 3. Moreover, in the flowchart of FIG. 11, the same processing as that of the flowchart of FIG. 8 is denoted by the same step number, and the description thereof is omitted.

As illustrated in FIG. 11, steps S201 to S204 are executed as in Embodiment 2. When the second detection unit 8 detects the object 10 in the second sensing layer 26 by the object 10 passing through the second sensing layer 26 in the direction approaching the display surface 14 (see FIG. 6) in step S204 (YES in S204), the display control unit 40B determines an enlargement magnification of a first partial operation screen including the position of the cursor 42 (any one of the first partial operation screens 44a to 44d) based on the first movement time computed by the detection processing unit 34B (S301). In this way, the display control unit 40B enlarges and displays the first partial operation screen including the position of the cursor 42 on the display surface 14 of the display unit 4 at the determined enlargement magnification (S205).

Thereafter, steps S206 and S207 are executed as in Embodiment 2. When the third detection unit 48 detects the object 10 in the third sensing layer 50 by the object 10 passing through the third sensing layer 50 in the direction approaching the display surface 14 in step S207 (YES in S207), the display control unit 40B determines an enlargement magnification of a second partial operation screen including the position of the cursor 42 (any one of the second partial operation screens 46a to 46d) based on the second movement time computed by the detection processing unit 34B (S302). In this way, the display control unit 40B enlarges and displays the second partial operation screen including the position of the cursor 42 on the display surface 14 of the display unit 4 at the determined enlargement magnification (S208). Thereafter, step S209 is executed as in Embodiment 2 described above.

3-3. Effect

As described above, by appropriately adjusting the first movement time and the second movement time of the object 10, it is possible to change the respective enlargement magnifications of the first partial operation screen and the second partial operation screen, and it is possible to further enhance the operability of the input device 2B.

3-4. Modification Example

In the present embodiment, the display control unit 40B determines the enlargement magnification of the first partial operation screens 44a to 44d based on the first movement time computed by the detection processing unit 34B. However, the disclosure is not limited thereto. For example, the detection processing unit 34B may compute the size (for example, the number of fingers) of the object 10 in the second sensing layer 26 based on the detection signal from the second detection unit 8. In this case, the display control unit 40B may determine the enlargement magnification of the first partial operation screens 44a to 44d based on the size of the object 10 computed by the detection processing unit 34B. Here, the display control unit 40B performs determination in a manner that the enlargement magnification of the first partial operation screens 44a to 44d increases as the size of the object 10 increases. For example, the display control unit 40B determines the enlargement magnification to be "1.5 times" when one finger passes through the second sensing layer 26, and the display control unit 40B determines the enlargement magnification to be "4 times" when three fingers pass through the second sensing layer 26.

Similarly, in the present embodiment, the display control unit 40B determines the enlargement magnification of the second partial operation screens 46a to 46d based on the second movement time computed by the detection processing unit 34B. However, the disclosure is not limited thereto. For example, the detection processing unit 34B may compute the size of the object 10 in the third sensing layer 50 based on the detection signal from the third detection unit 48. In this case, the display control unit 40B may determine the enlargement magnification of the second partial operation screens 46a to 46d based on the size of the object 10 computed by the detection processing unit 34B. Here, the display control unit 40B performs determination in a manner that the enlargement magnification of the second partial operation screens 46a to 46d increases as the size of the object 10 increases.

In addition, in the present embodiment, when the object 10 passes through the second sensing layer 26 in the direction approaching the display surface 14, the first partial operation screen including the position of the cursor 42 is enlarged and displayed on the display surface 14 of the display unit 4. However, the disclosure is not limited thereto. When the object 10 passes through the second sensing layer 26 in the direction away from the display surface 14, the enlarged and displayed first partial operation screen may be reduced and displayed on the display surface 14 of the display unit 4. In this instance, the display control unit 40B determines a reduction magnification of the first partial operation screen based on a third movement time computed by the detection processing unit 34B (movement time when the object 10 moves from the second sensing layer 26 to the first sensing layer 20). Here, the display control unit 40B performs determination in a manner that the reduction magnification of the first partial operation screen decreases as the third movement time increases.

Similarly, when the object 10 passes through the third sensing layer 50 in the direction away from the display surface 14, the enlarged and displayed second partial operation screen may be reduced and displayed on the display surface 14 of the display unit 4. In this instance, the display control unit 40B determines the reduction magnification of the second partial operation screen based on a fourth movement time computed by the detection processing unit 34B (movement time when the object 10 moves from the third sensing layer 50 to the second sensing layer 26). Here, the display control unit 40B performs determination in a manner that the reduction magnification of the second partial operation screen decreases as the fourth movement time increases.

(Other modification examples and the like) The input devices according to Embodiments 1 to 3 of the disclosure have been described above. However, the disclosure is not limited to these embodiments. For example, the above respective embodiments may be combined.

In each of the above embodiments, the operation screen 12 is displayed on the display surface 14 of the display unit 4 including the liquid crystal display panel. However, the disclosure is not limited to thereto. The operation screen may be, for example, an aerial image (real image) formed on a display surface which is an aerial display region, or may be a projection image projected on a display surface on a screen by a projector.

In addition, in the above Embodiment 1, the first detection unit 6 and the second detection unit 8 are separately configured. However, the disclosure is not limited thereto, and these detection units may be integrally configured. That is, each function of the first detection unit 6 and the second detection unit 8 may be realized by one detection unit.

Similarly, in the above Embodiments 2 and 3, the first detection unit 6, the second detection unit 8, and the third detection unit 48 are separately configured. However, the disclosure is not limited thereto, and these detection units may be integrally configured.

In addition, in each of the above embodiments, the object 10 is the finger of the user. However, the disclosure is not limited thereto, and the object 10 may be, for example, an indicator stick, etc.

In addition, specifically, each of the above devices may be configured as a computer system including a microprocessor, a ROM (read only memory), a RAM (random access memory), a hard disk drive, a display unit, a keyboard, a mouse, etc. A computer program is stored in the RAM or the hard disk drive. Each device achieves a function thereof by the microprocessor operating according to the computer program. Here, the computer program is configured by combining a plurality of instruction codes indicating instructions for the computer in order to achieve a predetermined function.

Furthermore, some or all of the components configuring each of the aforementioned devices may be configured by a single system LSI (Large Scale Integration). The system LSI is an ultra-multifunctional LSI manufactured by integrating a plurality of components on a single chip. Specifically, the system LSI is a computer system including a microprocessor, a ROM, a RAM, etc. A computer program is stored in the RAM. The system LSI achieves functions thereof by the microprocessor operating according to the computer program.

Furthermore, some or all of the components configuring each of the aforementioned devices may include an IC card or a single module that can be attached to and detached from each device. The IC card or the module is a computer system that includes a microprocessor, a ROM, a RAM, etc. The IC card or the module may include the ultra-multifunctional LSI described above. The IC card or the module achieves a function thereof by the microprocessor operating according to a computer program. This IC card or this module may have tamper resistance.

In addition, the disclosure may be the aforementioned methods. Further, the disclosure may be a computer program that realizes these methods by a computer, or may be a digital signal including the computer program.

Furthermore, in the disclosure, the computer program or the digital signal may be recorded in a computer-readable non-transitory recording medium, for example, a flexible disk, a hard disk, a CD-ROM, an MO, a DVD, a DVD-ROM, a DVD-RAM, a BD, a semiconductor memory, etc. In addition, the disclosure may be the digital signal recorded in these non-transitory recording media.

In addition, in the disclosure, the computer program or the digital signal may be transmitted via an electric communication line, a wireless or wired communication line, a network represented by the Internet, a data broadcast, etc.

In addition, the disclosure may be a computer system including a microprocessor and a memory, in which the memory stores the computer program, and the microprocessor operates according to the computer program.

In addition, another independent computer system may be used for implementation by recording the program or the digital signal in the non-transitory recording medium and transferring the program or the digital signal or by transferring the program or the digital signal via the network, etc.

Moreover, in each of the above embodiments, each component may be configured by dedicated hardware or may be realized by executing a software program suitable for each component. Each component may be realized by a program execution unit such as a CPU or a processor reading and executing a software program recorded in a recording medium such as a hard disk or a semiconductor memory.

The input device of the disclosure can be applied as, for example, a user interface for operating a device.

Other Configurations

According to one embodiment of the disclosure, an input device is provided for receiving a specific non-contact operation performed on an operation screen by an object, including: a display control unit that displays the operation screen on a display surface; and a detection unit that detects a position of the object in each of a plurality of sensing layers in air formed side by side in a direction substantially perpendicular to the display surface. When the object passes through a specific sensing layer among the plurality of sensing layers in a direction approaching the display surface, the display control unit determines, based on a detection result of the detection unit, a first partial operation screen and enlarges and displays the determined first partial operation screen on the display surface. The first partial operation screen is a part of the operation screen and comprises a position on the operation screen corresponding to a position of the object in the specific sensing layer.

According to the embodiment, the display control unit enlarges and displays on the display surface the first partial operation screen including the position on the operation screen corresponding to the position of the object in the specific sensing layer through which the object passes. In this way, the user can reliably perform a specific non-contact operation such as a non-contact single touch gesture on, for example, a target position on the first partial operation screen while visually checking the enlarged and displayed first partial operation screen. As a result, the operability of the input device can be improved.

For example, in the input device according to one embodiment of the disclosure, the plurality of sensing layers may comprise a first sensing layer formed at a position farthest from the display surface, and when the object passes through the first sensing layer in the direction approaching the display surface, the display control unit may display a cursor on the operation screen.

According to the embodiment, since the display control unit displays a cursor on the operation screen when the object passes the first sensing layer in the direction approaching the display surface, the user can easily recognize that the object passes through the first sensing layer.

For example, in the input device according to one embodiment of the disclosure, the plurality of sensing layers may further comprise a second sensing layer formed between the display surface and the first sensing layer, and the display control unit may enlarge and display the first partial operation screen on the display surface when the object passes through the first sensing layer in the direction approaching the display surface, determine, when the object passes through the second sensing layer in the direction approaching the display surface, a second partial operation screen being a part of the enlarged and displayed first partial operation screen and including a position on the first partial operation screen corresponding to a position of the object in the second sensing layer, and enlarge and display the determined second partial operation screen on the display surface.

According to the embodiment, since a part of the operation screen is enlarged and displayed in a stepwise manner on the display surface, the user can more reliably perform a specific non-contact operation such as a non-contact single touch gesture on, for example, a target position on the second partial operation screen while visually checking the second partial operation screen on which a part of the first partial operation screen is further enlarged and displayed. As a result, the operability of the input device can be further improved.

For example, in the input device according to one embodiment of the disclosure, the input device may further comprise a determination unit that determines that the specific non-contact operation is performed when the object passes through the second sensing layer in the direction approaching the display surface.

According to the embodiment, when the object passes through the second sensing layer in the direction approaching the display surface, it is possible to enlarge and display the second partial operation screen on the display surface, and to determine that the specific non-contact operation is performed.

For example, in the input device according to one embodiment of the disclosure, the plurality of sensing layers may further comprise a second sensing layer formed between the display surface and the first sensing layer, and a third sensing layer formed between the display surface and the second sensing layer, and the display control unit may enlarge and display the first partial operation screen on the display surface when the object passes through the second sensing layer in the direction approaching the display surface, determine, when the object passes through the third sensing layer in the direction approaching the display surface, a second partial operation screen being a part of the enlarged and displayed first partial operation screen and including a position on the first partial operation screen corresponding to a position of the object in the third sensing layer, and enlarge and display the determined second partial operation screen on the display surface.

According to the embodiment, since a part of the operation screen is enlarged and displayed in a stepwise manner on the display surface, the user can more reliably perform a specific non-contact operation such as a non-contact single touch gesture on, for example, a target position on the second partial operation screen while visually checking the second partial operation screen on which a part of the first partial operation screen is further enlarged and displayed. As a result, the operability of the input device can be further improved.

For example, in the input device according to one embodiment of the disclosure, the input device may further comprise a determination unit that determines that the specific non-contact operation is performed when the object passes through the third sensing layer in the direction approaching the display surface.

According to the embodiment, when the object passes through the third sensing layer in the direction approaching the display surface, it is possible to enlarge and display the second partial operation screen on the display surface, and to determine that the specific non-contact operation is performed.

For example, in the input device according to one embodiment of the disclosure, in a case that the second partial operation screen is enlarged and displayed on the display surface, the display control unit may return display on the display surface from the enlarged and displayed second partial operation screen to the original operation screen when the object passes through the first sensing layer in a direction away from the display surface.

According to the embodiment, when the object passes through the first sensing layer in the direction away from the display surface, the display on the display surface returns to the original operation screen. Thus, for example, the user can attempt another non-contact operation after the specific non-contact operation is performed.

For example, in the input device according to one embodiment of the disclosure, the display control unit may determine an enlargement magnification of the first partial operation screen based on a movement time when the object moves to the specific sensing layer from a sensing layer adjacent to the specific sensing layer in the direction approaching the display surface.

According to the embodiment, the user can change the enlargement magnification of the first partial operation screen by appropriately adjusting the movement time of the object.

For example, in the input device according to one embodiment of the disclosure, the display control unit may determine an enlargement magnification of the first partial operation screen based on a size of the object in the specific sensing layer.

According to the embodiment, the user can change the enlargement magnification of the first partial operation screen by appropriately adjusting the size of the object in the specific sensing layer.

Moreover, the disclosure can be realized as a program for causing a computer to function as a characteristic processing unit included in an input device or a program for causing a computer to execute characteristic steps included in an aerial image display method. Needless to say, such a program can be distributed via a computer-readable non-temporary recording medium such as a CD-ROM (Compact Disc-Read Only Memory) or a communication network such as the Internet.

According to the input device of one embodiment of the disclosure, it is possible to enhance operability.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An input device for receiving a specific non-contact operation performed on an operation screen by an object, the input device comprising:
   a display control unit that displays the operation screen on a display surface, wherein the operation screen is divided into a plurality of first partial operation screen; and
   a detection unit that detects a position of the object in each of a plurality of sensing layers in air formed side by side in a direction substantially perpendicular to the display surface,
   wherein when the object passes through a specific sensing layer among the plurality of sensing layers in a direction approaching the display surface, the display control unit determines, based on a detection result of the detection unit, a determined first partial operation screen among the plurality of first partial operation screen and enlarges and displays the determined first partial operation screen on the entire display surface, wherein the first partial operation screen is a part of the operation screen and comprises a position on the operation screen corresponding to a position of the object in the specific sensing layer.

2. The input device according to claim 1, wherein the plurality of sensing layers comprises a first sensing layer formed at a position farthest from the display surface, and
when the object passes through the first sensing layer in the direction approaching the display surface, the display control unit displays a cursor on the operation screen.

3. The input device according to claim 2, wherein the plurality of sensing layers further comprises a second sensing layer formed between the display surface and the first sensing layer, and
the display control unit enlarges and displays the determined first partial operation screen on the display surface when the object passes through the first sensing layer in the direction approaching the display surface, and
when the object passes through the second sensing layer in the direction approaching the display surface, the display control unit determines a second partial operation screen and enlarges and displays the second partial operation screen on the display surface, wherein the second partial operation screen is a part of the determined first partial operation screen that is enlarged and displayed, and comprises a position on the determined first partial operation screen corresponding to a position of the object in the second sensing layer.

4. The input device according to claim 3, further comprising:
a determination unit that determines that the specific non-contact operation is performed when the object passes through the second sensing layer in the direction approaching the display surface.

5. The input device according to claim 4, wherein in a case that the second partial operation screen is enlarged and displayed on the display surface, the display control unit returns a display on the display surface from an enlarged and displayed second partial operation screen to the operation screen when the object passes through the first sensing layer in a direction away from the display surface.

6. The input device according to claim 3, wherein in a case that the second partial operation screen is enlarged and displayed on the display surface, the display control unit returns a display on the display surface from an enlarged and displayed second partial operation screen to the operation screen when the object passes through the first sensing layer in a direction away from the display surface.

7. The input device according to claim 3, wherein the display control unit determines an enlargement magnification of the determined first partial operation screen based on a movement time when the object moves to the specific sensing layer from a sensing layer adjacent to the specific sensing layer in the direction approaching the display surface.

8. The input device according to claim 3, wherein the display control unit determines an enlargement magnification of the determined first partial operation screen based on a size of the object in the specific sensing layer.

9. The input device according to claim 2, wherein the plurality of sensing layers further comprises:
a second sensing layer formed between the display surface and the first sensing layer, and
a third sensing layer formed between the display surface and the second sensing layer, and
the display control unit enlarges and displays the determined first partial operation screen on the display surface when the object passes through the second sensing layer in the direction approaching the display surface, and
when the object passes through the third sensing layer in the direction approaching the display surface, the display control unit determines a second partial operation screen and enlarges and displays the second partial operation screen on the display surface, wherein the second partial operation screen is a part of the determined first partial operation screen that is enlarged and displayed, and comprises a position on the first partial operation screen corresponding to a position of the object in the third sensing layer.

10. The input device according to claim 9, further comprising:
a determination unit that determines that the specific non-contact operation is performed when the object passes through the third sensing layer in the direction approaching the display surface.

11. The input device according to claim 10, wherein in a case that the second partial operation screen is enlarged and displayed on the display surface, the display control unit returns a display on the display surface from an enlarged and displayed second partial operation screen to the operation screen when the object passes through the first sensing layer in a direction away from the display surface.

12. The input device according to claim 9, wherein in a case that the second partial operation screen is enlarged and displayed on the display surface, the display control unit returns a display on the display surface from an enlarged and displayed second partial operation screen to the operation screen when the object passes through the first sensing layer in a direction away from the display surface.

13. The input device according to claim 9, wherein the display control unit determines an enlargement magnification of the determined first partial operation screen based on a movement time when the object moves to the specific sensing layer from a sensing layer adjacent to the specific sensing layer in the direction approaching the display surface.

14. The input device according to claim 9, wherein the display control unit determines an enlargement magnification of the determined first partial operation screen based on a size of the object in the specific sensing layer.

15. The input device according to claim 1, wherein the display control unit determines an enlargement magnification of the determined first partial operation screen based on a movement time when the object moves to the specific sensing layer from a sensing layer adjacent to the specific sensing layer in the direction approaching the display surface.

16. The input device according to claim 1, wherein the display control unit determines an enlargement magnification of the determined first partial operation screen based on a size of the object in the specific sensing layer.

* * * * *